(12) United States Patent
Pettengill

(10) Patent No.: US 11,371,269 B2
(45) Date of Patent: Jun. 28, 2022

(54) ACTIVATION DEVICE FOR AT LEAST TWO SPATIALLY SEPARATED MOTOR VEHICLE CLOSURE UNITS

(71) Applicant: Kiekert AG, Heiligenhaus (DE)

(72) Inventor: Robert S. Pettengill, Farmington, MI (US)

(73) Assignee: Kiekert AG, Heiligenhaus (DE)

( * ) Notice: Subject to any disclaimer, the term of this patent is extended or adjusted under 35 U.S.C. 154(b) by 819 days.

(21) Appl. No.: 16/264,789

(22) Filed: Feb. 1, 2019

(65) Prior Publication Data

US 2020/0248489 A1  Aug. 6, 2020

(51) Int. Cl.
| | |
|---|---|
| *E05B 81/40* | (2014.01) |
| *E05B 81/28* | (2014.01) |
| *E05B 83/18* | (2014.01) |
| *E05B 83/34* | (2014.01) |
| *F16H 25/20* | (2006.01) |

(52) U.S. Cl.
CPC .............. *E05B 81/40* (2013.01); *E05B 81/28* (2013.01); *E05B 83/18* (2013.01); *E05B 83/34* (2013.01); *F16H 25/20* (2013.01); *E05Y 2900/534* (2013.01); *E05Y 2900/546* (2013.01); *F16H 2025/2043* (2013.01)

(58) Field of Classification Search
CPC .......... E05B 81/40; E05B 81/28; E05B 83/18; E05B 83/34; F16H 25/20; E05Y 2900/546

See application file for complete search history.

(56) References Cited

U.S. PATENT DOCUMENTS

| | | | | |
|---|---|---|---|---|
| 3,643,378 A | * | 2/1972 | Velavicius ............ | E05F 1/1238 49/374 |
| 4,702,117 A | | 10/1987 | Tsutsumi et al. | |
| 5,058,258 A | * | 10/1991 | Harvey .................. | E05B 81/28 292/201 |
| 5,762,384 A | * | 6/1998 | Bartel .................... | E05B 81/40 292/201 |
| 6,055,776 A | * | 5/2000 | Dettling ................ | E05F 15/619 74/625 |

(Continued)

FOREIGN PATENT DOCUMENTS

DE         4413277 A1    10/1995

OTHER PUBLICATIONS

International Search Report dated May 6, 2020, for corresponding International Patent Application No. PCT/IB2020/050510.

(Continued)

*Primary Examiner* — David M Fenstermacher
(74) *Attorney, Agent, or Firm* — Renner, Otto, Boisselle & Sklar, LLP

(57) ABSTRACT

An activation device for at least two spatially separated motor vehicle closure units, for example for a tailgate latch on the one hand and a fuel filler door latch on the other hand. The activation device possesses a linear drive with a linear actuator. Dependent on its activation direction, the linear drive impinges either the first motor vehicle closure unit or the other second motor vehicle closure unit. According to the invention, dependent on its actuating direction, the linear actuator impinges at least a pivotable activation lever to interact with either the first motor vehicle closure unit or the other second motor vehicle closure unit.

20 Claims, 4 Drawing Sheets

(56) References Cited

U.S. PATENT DOCUMENTS

Figure 1:
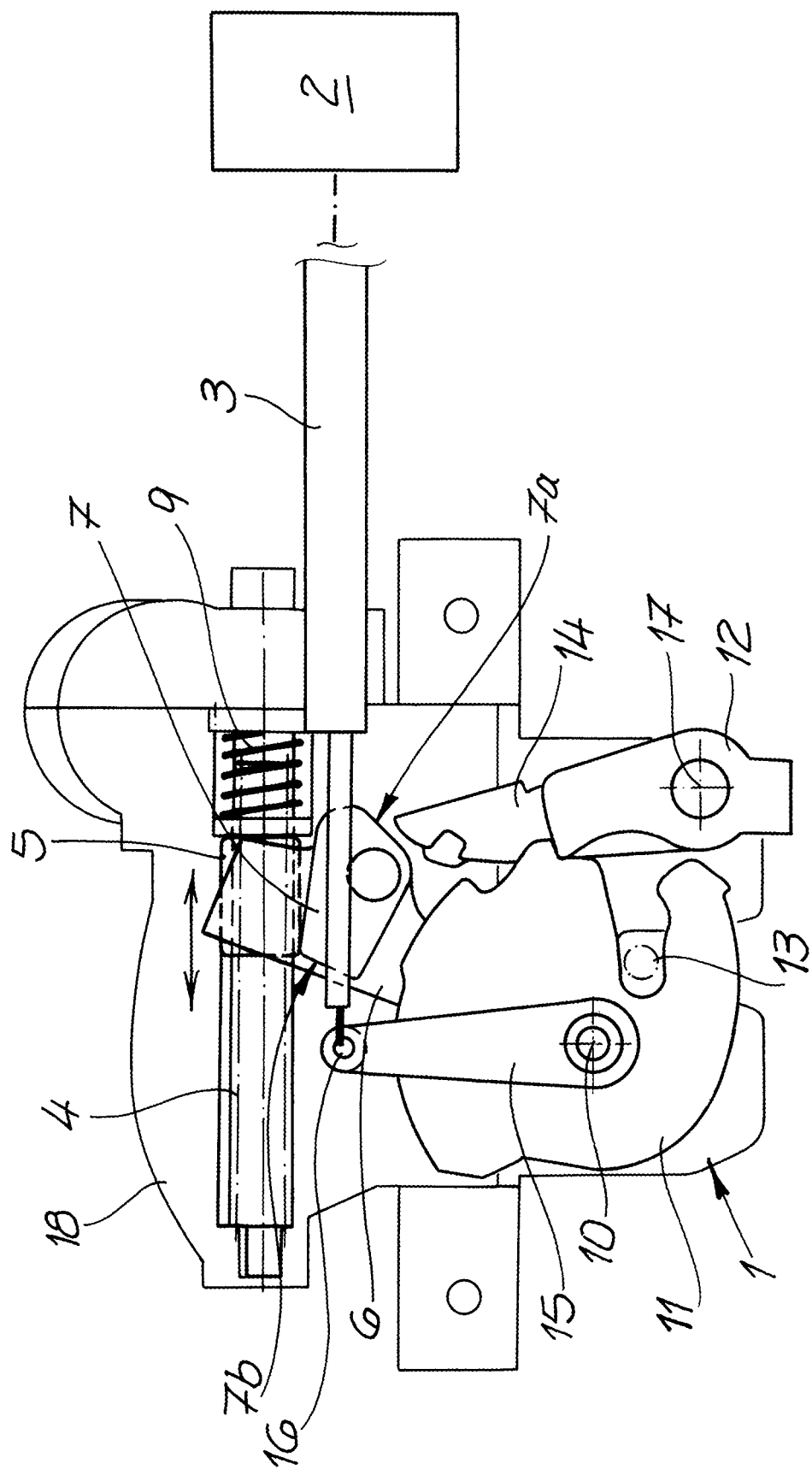

| | | | |
|---|---|---|---|
| 2013/0056994 A1* | 3/2013 | Sago | E05B 77/34 |
| | | | 292/101 |
| 2017/0058574 A1 | 3/2017 | Cheng | |
| 2018/0171680 A1 | 6/2018 | Hunt et al. | |
| 2018/0171681 A1 | 6/2018 | Hunt | |
| 2018/0216378 A1 | 8/2018 | Hunt | |
| 2021/0122463 A1* | 4/2021 | Bernard | B64C 29/0033 |
| 2021/0254374 A1* | 8/2021 | Scholz | E05B 81/40 |
| 2021/0293059 A1* | 9/2021 | Strole | E05B 81/20 |
| 2021/0301562 A1* | 9/2021 | Cumbo | E05B 79/08 |
| 2021/0388646 A1* | 12/2021 | Debroucke | E05B 81/42 |
| 2022/0049526 A1* | 2/2022 | Matsumura | E05F 15/611 |
| 2022/0056752 A1* | 2/2022 | An | H04B 1/7163 |

OTHER PUBLICATIONS

International Preliminary Report on Patentability dated Jul. 27, 2021, for corresponding International Patent Application No. PCT/IB2020/050510.

* cited by examiner

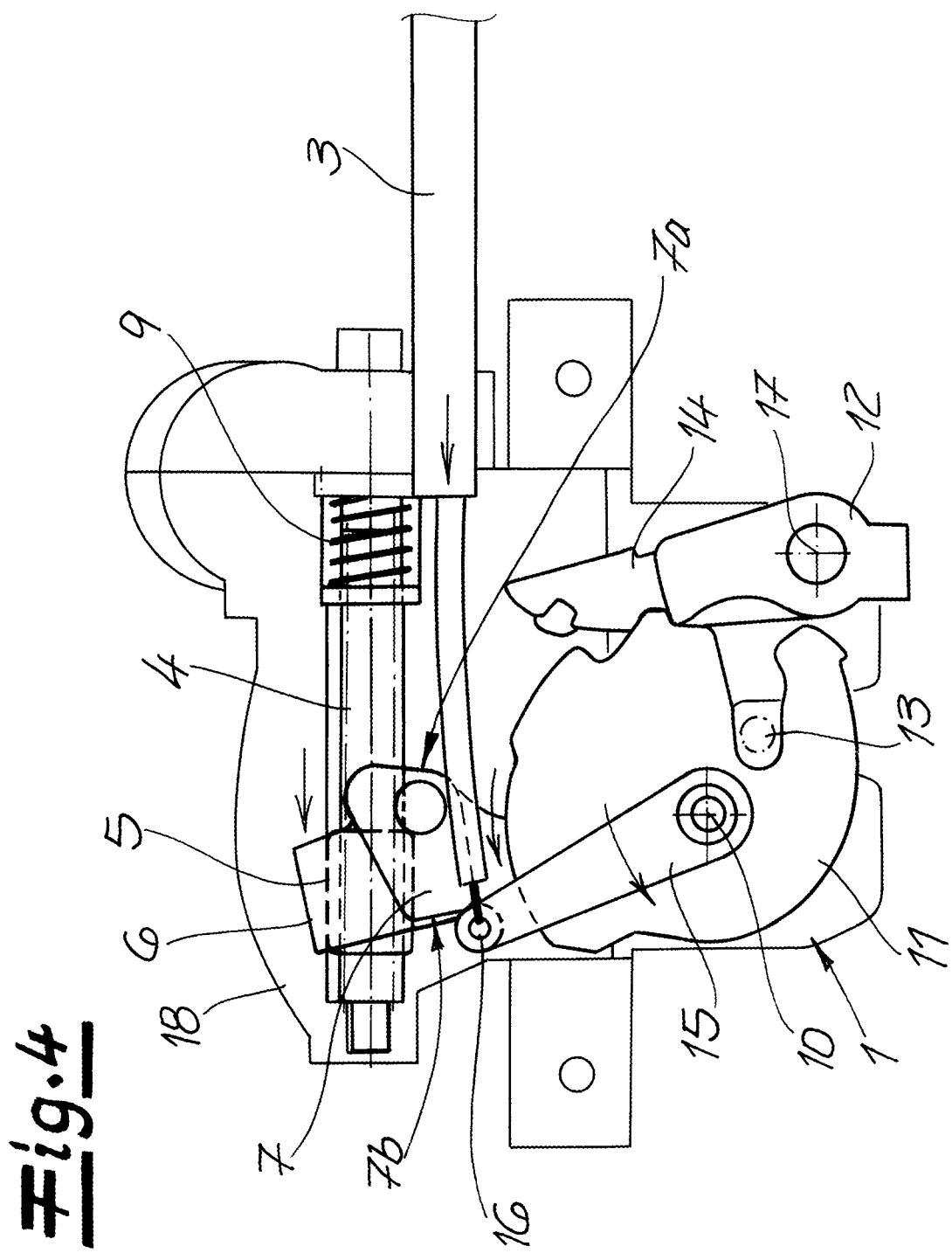

ACTIVATION DEVICE FOR AT LEAST TWO SPATIALLY SEPARATED MOTOR VEHICLE CLOSURE UNITS

The invention relates to an activation device for at least two spatially separated motor vehicle closure units, for example for a tailgate latch on the one hand and a fuel filler door latch on the other hand, with a drive designed as a linear drive with a linear actuator, which impinges either the first motor vehicle closure unit or the second motor vehicle closure unit dependent on its activation direction. It is also possible to use the invention for doors or flaps for electric vehicle plug-in charging ports.

Within the scope of DE 44 13 277 A1 of the applicant, the theoretical possibility has already been described of impinging two spatially separated motor vehicle closure units with the aid of a (single) activation device. The relevant motor vehicle closure units involve both a tailgate flap or a tailgate section flap and a fuel filler door latch or the latch of a tank valve chamber flap. For this purpose, a single actuator is provided for to which two mechanical power transmission systems are directly or indirectly connected which typically involve Bowden cables.

One power transmission system operates the tailgate latch while the other power transmission system works on the fuel filler door latch. The activation device thus executed can be operated with the aid of a mechanical or electronic key. For this purpose, the activation device is arranged in the tailgate area of the motor vehicle. This has proven itself in principle.

In the class-specific state of the art according to U.S. Pat. No. 4,702,117, a linear drive is provided for with a linear actuator. Bowden cables are directly connected to the linear actuator or interact with contours in a housing. This aims to achieve a compact construction.

The state of the art is not convincing in all aspects. Because in U.S. Pat. No. 4,702,117 the function is dependent on a complicated housing formation of the linear drive. In particular after a long standing time or in the event of unfavorable environmental conditions, functional impairments can result due to increased friction, rust, encrustations, etc. The relatively complicated construction according to DE 44 13 277 A1 faces comparable problems, especially as the actuator there is equipped with a crank drive or a toothed rack inter alia. This is where the invention as a whole wishes to provide assistance.

The invention is based on the technical problem of further developing such an activation device in such a way that a simultaneously functional, compact and cost-effective construction is achieved.

In order to solve this technical problem, a class-specific activation device for at least two spatially separated motor vehicle closure units within the scope of the invention is characterized in that the linear actuator as a component of the linear drive according to its actuating movement impinges at least a pivotable activation lever for interaction with either one motor vehicle closure unit or the other second motor vehicle closure unit.

Within the scope of the invention, the linear movement of the linear actuator or its actuating movement is initially converted into a pivoting movement. The interaction of the linear actuator with the pivotable activation lever ensures this. The pivotable activation lever then impinges either the first motor vehicle closure unit or the other second motor vehicle closure unit.

The invention comes from the insight that conversion of the actuating movement of the linear actuator or its linear movement into the rotation of the pivotable activation lever can occur easily and functionally. This means any functional defects must not be feared with such a change in movement. At the same time, such a construction can be achieved simply and cost-effectively, especially as such linear drives with a linear actuator are cost-effectively available in large numbers.

Work can take place overall and theoretically with two pivotable activation levers. One activation lever ensures interaction with one motor vehicle closure unit while the other activation lever works on the other second motor vehicle closure unit. Thus, either one motor vehicle closure unit or the other second motor vehicle closure unit are impinged.

The respective activation lever may in this case be integrated into the pertaining motor vehicle closure unit and is consequently protected from environmental influences. Alternatively, the relevant activation lever can be provided for inside a housing of the activation device. Hybrid forms are also conceivable. Then, for example, one activation lever is integrated into the motor vehicle closure unit while the other activation lever is located inside the housing of the activation device.

Generally, and in order to achieve an especially cost-effective construction, however, a (single) common pivotable activation lever interacting with both motor vehicle closure units is provided for. In this case, the drive or linear drive is assigned to one of the two motor vehicle closure units together with the common activation levers. In order to achieve optimum protection and the desired functional safety, in this context the drive and the common activation lever are advantageously integrated into the assigned motor vehicle closure unit. In this case, the activation device and the pertaining motor vehicle closure unit consequently form a constructional unit. The housing of the motor vehicle closure unit simultaneously accommodates the activation device in its interior and acts as a housing for the activation device.

In both cases, i.e. both in the execution of two pivotable activation levers and also if a common pivotable activation lever is provided for, the common activation lever or one of the two activation levers is advantageously located on a pivoting lever to impinge a connector to the spatially separated motor vehicle closure unit. This means, in this case the relevant activation lever impinges the relevant pivoting lever inside the activation device which in turn works on the connector. The connector generates the mechanical connection of the pivoting lever of the activation device to the motor vehicle closure unit which is spatially separated from the activation device.

The common activation lever or the other one of the two activation levers can preferably interact with a triggering lever to impinge a locking mechanism of the pertaining motor vehicle closure unit. In this case, it is mostly proceeded in such a way that the activation device and the relevant motor vehicle closure unit define a constructional unit and consequently the relevant activation lever and also the triggering lever are accommodated inside the housing of the stated motor vehicle closure unit.

The following topologies are therefore conceivable in principle. The invention encompasses an activation device which is arranged so to speak between or in the center between two spatially separated motor vehicle closure units. For this purpose, the activation device is advantageously mechanically coupled with the two spatially separated motor vehicle closure units and respectively with a connector. The connector can be a Bowden cable or also a Bowden cable wire in the simplest case. In this case, the activation device in a pertaining housing demonstrates the linear drive with the linear actuator and also one activation lever which work on the pivoting lever to impinge the relevant connector. The other activation lever is regularly provided for and executed in the housing of the other motor vehicle closure unit in contrast. A further connector which is connected directly to the linear actuator impinges this activation lever and is impinged by this.

In addition to such a layout with three elements so to speak, the central activation device and the two motor vehicle closure units respectively connected on both sides via the pertaining connectors, a variant is used with particular preference in which the activation device is integrated into a motor vehicle closure unit. At least one housing is thus superfluous because the housing for the activation device and the housing of the assigned motor vehicle closure unit coincide. In this case, the relevant motor vehicle closure unit is usually the first motor vehicle closure unit, advantageously the tailgate latch. i.e. in this case, the activation unit is integrated into the tailgate latch or the tailgate latch housing.

In contrast to this tailgate latch housing with an integrated activation device, the other second motor vehicle door closure unit is spatially separated. This second motor vehicle closure unit is generally the fuel filler door latch. The connector connects the constructional unit consisting of the first motor vehicle closure unit and the activation device with the spatially separated other second motor vehicle closure unit.

The only connector in this case is impinged with the aid of the pivoting lever integrated into the relevant constructional unit. Consequently, in this case not only a functional construction is achieved, but special price advantages are observed. At the same time, such a design is particularly lightweight, which plays a growing role in increasing motor vehicle weights.

Finally, it has been proven when the (only) and common activation lever is located coaxially to the catch of the locking mechanism. This design is advantageously executed in conjunction with the constructional unit consisting of the activation device and the first motor vehicle closure unit or the tailgate latch. Because such a tailgate latch generally possesses a locking mechanism consisting of the relevant catch and a pertaining pawl.

Where in this case the activation lever is located coaxially compared to the catch as a component of the locking mechanism of the tailgate latch, an especially simple and cost-effective construction is observed because a common bolt is used both for the catch and the relevant activation lever to define the axis or the rotational axis.

Furthermore, what all designs have in common is that the activation lever is generally equipped with an activation cam located thereon. The pivoting lever can be impinged, for example, with the aid of this activation cam. Furthermore, the activation cam is able to impinge the triggering lever. Where a single common activation lever is used, the then also common and single activation cam with its two opposite cam surfaces both impinges the triggering lever and the pivoting lever.

The linear drive with a linear actuator used can be a linear drive which moves an adjusting lever backwards and forwards as a linear actuator. However, the invention generally has recourse to a screw drive with a threaded screw and a screw nut moving backwards and forwards as a linear actuator. Such screw drives are available in large numbers and take into account a cost-effective construction.

As a result, an activation device is introduced within the scope of the invention which initially works in an especially functional manner. This can be attributed to the fact that the actuating movement of the linear actuator and consequently the activation device of the linear drive in a linear direction is converted into a pivoting movement of the pivotable activation lever. As the activation device and one of the two spatially separated motor vehicle closure units advantageously define a constructional unit, synergic effects are also used.

Because in this case the activation device is integrated into the common housing together with the pertaining motor vehicle closure unit and uses this. As a consequence hereof, not only costs, but also weight advantages are observed. These are the crucial advantages.

Figure 2:
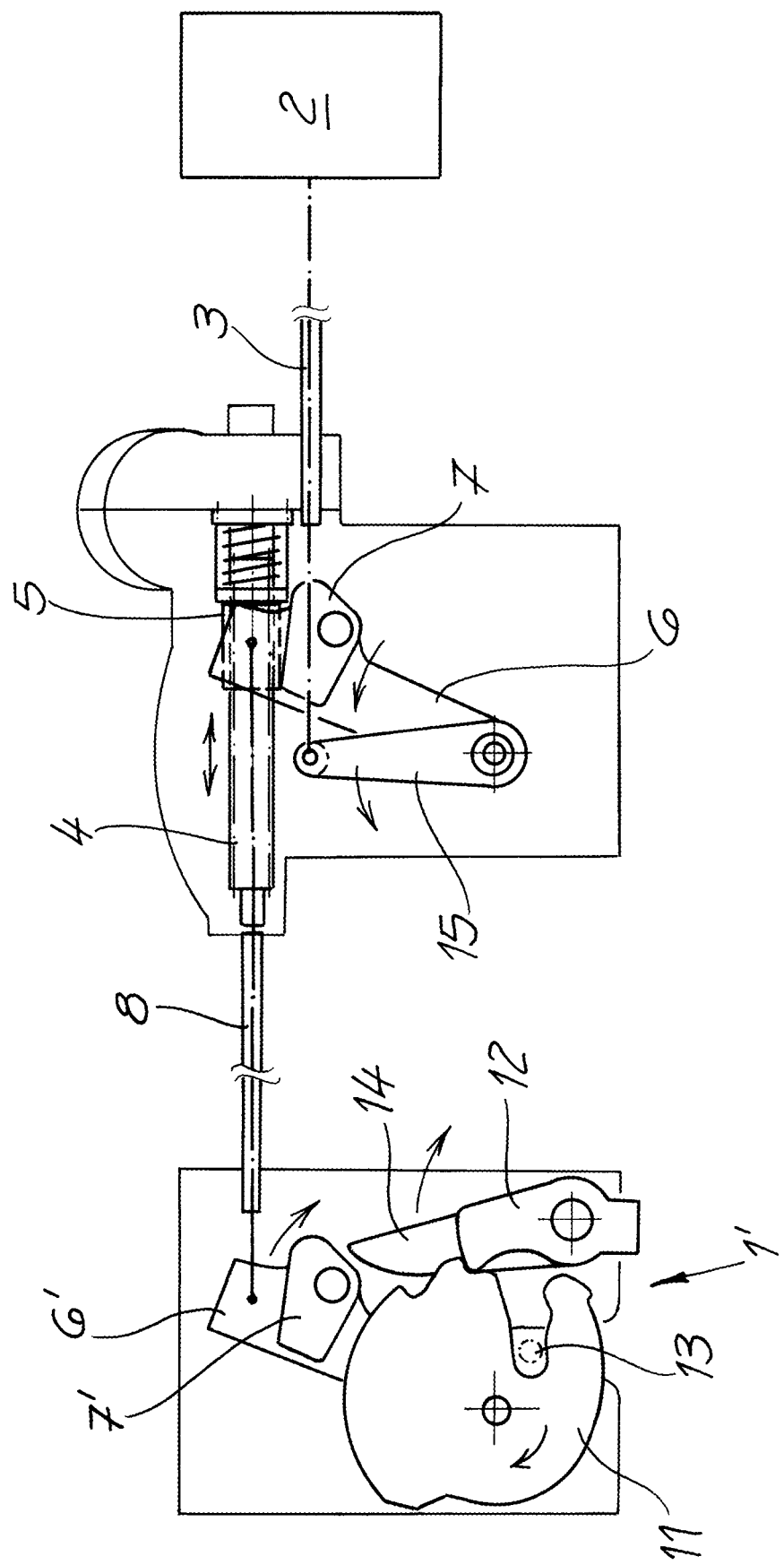
Figure 3:
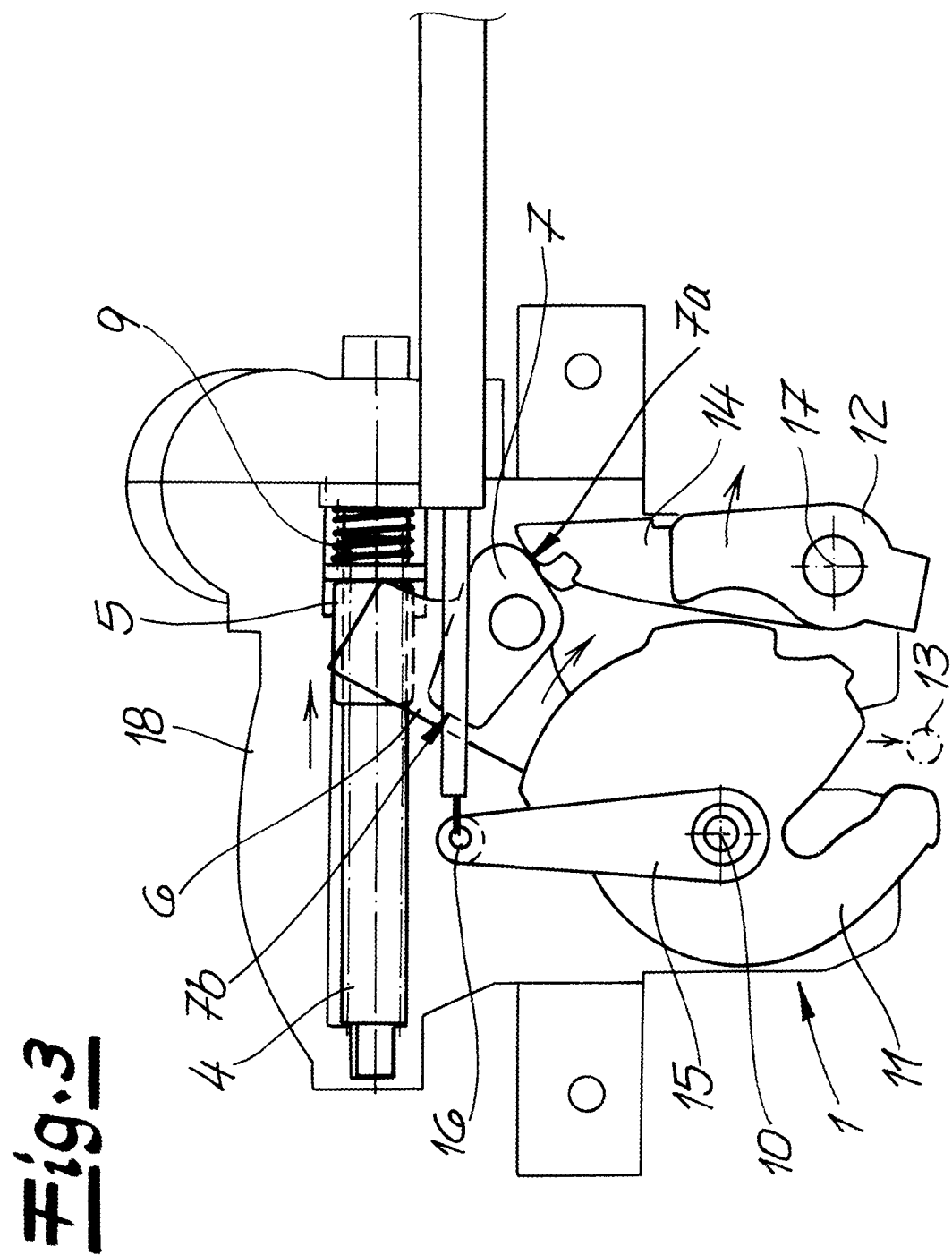

Hereinafter, the invention is explained in further detail on the basis of a sketch which only depicts an execution example. It shows:

FIG. 1 the activation device according to the invention diagrammatically in its neutral position, FIG. 2 an alternative execution according to FIG. 1 diagrammatically, FIG. 3 the object according to FIG. 1 on impingement of the first motor vehicle closure unit or the tailgate latch and FIG. 4 the object according to FIG. 1 on impingement of the other second motor vehicle closure unit or the fuel filler door latch.

In the figures, an activation device is depicted which impinges two spatially separated motor vehicle closure units 1, 2. The motor vehicle closure units 1, 2 in the execution example are not restrictedly on the one hand a tailgate latch 1 and on the other hand a fuel filler door latch 2. The fuel filler door latch 2 may be of a similar construction, as described in detail with reference to DE 102 59 465 A1. However, the activation device integrated into the first motor vehicle closure unit 1 in the execution example is mechanically connected via a connector 3 with the relevant fuel filler door latch 2 or the other second motor vehicle closure unit 2.

The activation device is in detail equipped with a linear drive 4, 5 with a linear actuator 5. The linear drive 4, 5 in the execution example comprises a screw or threaded screw 4 and a screw nut 5 which can be moved backwards and forwards on the threaded screw 4 as a linear actuator 5. Consequently, the linear drive 4, 5 thus executed is designed as a screw drive. The linear movements of the linear actuator or the screw nut 5 achievable hereby and consequently their actuating movement are depicted by a double arrow in FIGS. 1 and 2.

According to its activation device, the linear drive 4, 5 impinges either the first motor vehicle closure unit or the tailgate latch 1 or the other second motor vehicle closure unit or the fuel filler door latch 2. For this purpose, the linear actuator 5 works according to its actuating movement or linear movement indicated by the double arrow in FIG. 1 on a pivotable activation lever 6, 7.

It is recognized on the basis of the execution example within the scope of the neutral position according to FIG. 1 that in the present case only a (single) common activation lever 6, 7 is executed for both motor vehicle closure units 1, 2. However, it is also possible to have recourse to two activation levers 6, 7 and 6', 7', as depicted in FIG. 2. In this case, the activation device with the linear drive 4, 5 and the activation lever 6, 7 assigned to the fuel filler door latch 2 is arranged centrally between the two motor vehicle closure units 1', 2 spatially separated from the activation device. The linear drive 4, 5 works on the activation lever 6, 7, in order to impinge the fuel filler door latch 2 via a pivoting lever 15 and the interposed connector 3, to typically open.

The tailgate latch 1' which is spatially separated from the activation device is in this case connected to the linear drive 4, 5 via a further connector 8. To this end, the connector 8 or the Bowden cable executed here is connected with the linear actuator 5. A linear movement of the linear actuator 5 in this case ensures that the further second activation lever 6', 7' is pivoted inside the first motor vehicle closure unit 1' or the tailgate latch 1', via the interposed connector or the Bowden cable 8. The pivoting movement of the relevant activation lever 6', 7' ensures that the tailgate latch 1' is opened.

In the preferred execution example depicted in FIG. 1, however, the activation device is integrated into the tailgate latch 1. As soon as the activation device impinges the tailgate latch 1, this corresponds to the linear actuator or the screw nut 5 accomplishing a movement to the right depicted in FIG. 3. Hereby, a spring 9 impinging the linear actuator 5 is compressed. At the same time, this actuating movement of the linear actuator 5 ensures that the activation lever 6, 7 connected to the linear actuator 5 accomplishes a pivoting movement in a clockwise direction around its axis 10.

The axis 10 for one (single) activation lever 6, 7 in the depicted preferred execution example coincides with the axis or the rotational axis of a catch 11 as a component of a locking mechanism 11, 12. In addition to the catch 11 the locking mechanism 11, 12 also demonstrates a pawl 12 which together secure and retain a locking bolt 13 depicted in the figures with the tailgate and consequently the tailgate latch 1 closed.

In order to now open the tailgate and consequently the tailgate latch 1, the linear actuator 5 accomplishes the already described actuating movement to the right against spring force 9. As a consequence hereof, the activation lever 6, 7 is pivoted in the clockwise direction. Consequently, an activation cam 7 as a component of the activation lever 6, 7 impinges a triggering lever 14. The triggering lever 14 is pivotably located on an axis 17. A similar case applies to the pawl 12.

Therefore, as soon as the activation lever 6, 7 with its activation cam 7 located thereon travels against the triggering lever 14, the triggering lever 14 is taken along during the connected clockwise direction movement of the activation lever 6, 7. Consequently, the triggering lever 14 also accomplishes a pivoting movement in the clockwise direction depicted in FIG. 3. As the triggering lever 14 is mechanically connected to the pawl 2, this clockwise direction movement of the triggering lever 14 leads to the pawl 12 also being pivoted in a clockwise direction around the common axis 17 with the triggering lever 14.

Thus, the pawl 12 is released from the catch 11 and the locking mechanism 11, 12 overall is opened. The previously trapped locking bolt 13 is also released. Consequently, the tailgate typically connected to the locking bolt 13 can then be pivoted up by a non-illustrated motor vehicle chassis. The tailgate latch 1 is now opened by the linear actuator 5 as a component of the linear drive 4, 5 executing the described actuating movement or linear movement to the right starting from the neutral position according to FIG. 1. This is shown in FIG. 3.

In order to now also be able to open the fuel filler door latch 2 with the aid of the described activation device integrated into the tailgate latch 1 in the execution example, the linear actuator 5 is impinged into its other actuating movement with the aid of the threaded screw 4. A not explicitly illustrated and known electromotor ensures this. This other actuating movement of the linear actuator 5 corresponds to the linear actuator 5 being moved to the left starting from the neutral position in FIG. 1. That is depicted in FIG. 4 which in this case shows impingement of the fuel filler door latch 2.

It is recognized that during movement of the linear actuator 5 starting from the neutral position in FIG. 1 to the left within the scope of FIG. 4 of the activation lever 6, 7 the movement of the linear actuator 5 is to the left. Thus, the activation cam 7 located on the activation lever 6, 7 engages with a spigot on the rear of the pivoting lever 15. The pivoting lever 15 is also located on the axis 10 which aids the already described location of both the activation lever 6, 7 and the catch 11. The aforementioned spigot is located on the reverse of the pivoting lever 15 in the area of a suspended aperture 16 for a bore of the connector 3 designed as a Bowden cable and is only depicted in dashes in FIG. 4.

According to the execution example, the activation device is integrated into the first motor vehicle closure unit or the tailgate latch 1. Thus, a common housing 18 functions both to accommodate the relevant tailgate latch 1 and to accommodate and house the activation device. Furthermore, the activation cam 7 located on the activation lever 6, 7 is equipped with two cam surfaces 7a, 7b. Both cam surfaces 7a, 7b are opposite one another. The purpose of the first cam surface 7a is to impinge the triggering lever 14 and thus to lift the pawl 12 from the catch 11 via the triggering lever 14. Thus, the tailgate latch 1 can be opened as already described with reference to the illustration according to FIG. 3.

In contrast, the other second cam surface 7b travels against the rear spigot on the pivoting lever 15, as soon as the fuel filler door latch 2 should be opened. A movement of the linear actuator 5 within the scope of the illustration according to FIG. 4 to the left corresponds to this. Simultaneously, the activation lever 6, 7 is pivoted in an anti-clockwise direction around the axis 10. Thus, the pivoting lever 15 is also rotated in an anti-clockwise direction around the common axis 10.

As the connector 3 or the Bowden cable executed here is connected with its bore via the suspended aperture 16 on the pivoting lever 15, the pivoting movement of the pivoting lever 15 in an anti-clockwise direction around its axis 10 corresponds to the bore of the Bowden cable being impinged with traction to the left, as also illustrated in FIG. 4. Thus, in the simplest case, a bolting element is lifted by a spigot connected to a tank valve. As the tank valve is typically impinged by a spring in the opening direction, this leads to the tank valve no longer being held in the closed position with the aid of the bolting element, but at least jumping up slightly impinged by the spring and being able to be completely pivoted by an operator. This means that in this case the Bowden cable or the connector 3 substitutes the actuator already referenced in DE 102 59 465 A1 so to speak.

The invention claimed is:
1. An activation device for at least two spatially separated motor vehicle closure units, the activation device comprising:
 a linear drive;
 a linear actuator which, dependent on an activation direction, either impinges a first one of the motor vehicle closure units or a second one of the motor vehicle closure units;
 a pivotable activation lever, wherein during actuating movement of the linear actuator, the linear actuator, according to the actuating movement, impinges at least the pivotable activation lever to interact with either the first one of the motor vehicle closure units or the second one of the motor vehicle closure units; and
a triggering lever and a locking mechanism, wherein the activation lever interacts with the triggering lever to impinge the locking mechanism of the motor vehicle closure unit.

2. The activation device according to claim 1, further comprising a pivoting lever and a connector connected to the second one of the motor vehicle closure units, wherein the activation lever acts on the pivoting lever to impinge the connector.

3. The activation device according to claim 2, wherein the pivoting lever includes a spigot on a rear end thereof, wherein the activation lever is configured to engage the spigot.

4. The activation device according to claim 1, wherein the activation lever is located coaxially to a catch of the locking mechanism.

5. The activation device according to claim 1, wherein the activation lever has an activation cam located thereon.

6. The activation device according to claim 1, wherein the linear drive is a screw drive having a threaded screw and a screw nut which can be moved backwards and forwards thereon as the linear actuator.

7. The activation device according to claim 1, wherein further comprising a second pivotable activation lever, which either impinges the first one of the motor vehicle closure units or on the second one of the motor vehicle closure units.

8. The activation device according to claim 7, wherein the pivotable activation lever is integrated into the first one of the vehicle closure units and the second pivotable activation lever is arranged centrally between the first one of the vehicle closure units and the second one of the vehicle closure units.

9. The activation device according to claim 1, wherein the linear drive and the single lever are arranged proximate one of the first and second motor vehicle closure units.

10. The activation device according to claim 9, wherein the linear drive and the single lever are integrated into the corresponding one of the first and second motor vehicle closure units.

11. The activation device according to claim 1, wherein the pivotable activation lever is a single lever which interacts with both of the first and second motor vehicle closure units.

12. The activation device according to claim 1, wherein the first one of the vehicle closure units is a tailgate latch and the second one of the vehicle closure units is a fuel filler door latch.

13. The activation device according to claim 1, further comprising an activation cam arranged on the activation lever that is configured to impinge the triggering lever.

14. The activation device according to claim 13, wherein the activation cam includes two cam surfaces that are opposite each other, wherein one of the two cam surfaces impinges the triggering lever and another one of the two cam surfaces engages a pivoting lever.

15. An activation device for at least two spatially separated motor vehicle closure units, the activation device comprising:
a linear drive;
a linear actuator which, dependent on an activation direction, either impinges a first one of the motor vehicle closure units or a second one of the motor vehicle closure units;
a pivotable activation lever, wherein during actuating movement of the linear actuator, the linear actuator, according to the actuating movement, impinges at least the pivotable activation lever to interact with either the first one of the motor vehicle closure units or the second one of the motor vehicle closure units; and
a second pivotable activation lever, which either impinges the first one of the motor vehicle closure units or on the second one of the motor vehicle closure units;
wherein the linear drive is arranged centrally between the first one of the vehicle closure units and the second one of the vehicle closure units.

16. The activation device according to claim 15, wherein the second pivotable activation lever and the linear drive are spatially separated from the first one of the vehicle closure units.

17. The activation device according to claim 15, further comprising a connector that spatially separates the first one of the vehicle closure units and the linear drive.

18. The activation device according to claim 15, wherein the connector is a Bowden cable.

19. The activation device according to claim 15, further comprising a pivoting lever and a connector that are connected between the linear drive and the second one of the vehicle closure units.

20. An activation device for at least two spatially separated motor vehicle closure units, the activation device comprising:
a linear drive;
a linear actuator which, dependent on an activation direction, either impinges a first one of the motor vehicle closure units or a second one of the motor vehicle closure units;
a pivotable activation lever, wherein during actuating movement of the linear actuator, the linear actuator, according to the actuating movement, impinges at least the pivotable activation lever to interact with either the first one of the motor vehicle closure units or the second one of the motor vehicle closure units; and
a second pivotable activation lever, which either impinges the first one of the motor vehicle closure units or on the second one of the motor vehicle closure units;
wherein the pivotable activation lever is integrated into the first one of the vehicle closure units and the second pivotable activation lever is arranged centrally between the first one of the vehicle closure units and the second one of the vehicle closure units.

* * * * *